(12) United States Patent
Warke

(10) Patent No.: US 6,253,858 B1
(45) Date of Patent: Jul. 3, 2001

(54) SOIL CORE COLLECTOR

(76) Inventor: William Lyle Warke, 41 Mountsandel Road, Conleraine, County Londonderry BT52 1JE Northern Ireland (GB)

( * ) Notice: Subject to any disclaimer, the term of this patent is extended or adjusted under 35 U.S.C. 154(b) by 0 days.

(21) Appl. No.: 09/423,392
(22) PCT Filed: May 7, 1998
(86) PCT No.: PCT/GB98/01158
  § 371 Date: Jan. 6, 2000
  § 102(e) Date: Jan. 6, 2000
(87) PCT Pub. No.: WO98/49883
  PCT Pub. Date: Nov. 12, 1998

(30) Foreign Application Priority Data

May 7, 1997 (GB) ................................................ 9709191

(51) Int. Cl.⁷ .............................................. A01B 43/00
(52) U.S. Cl. ............................................ 172/22; 298/17 R
(58) Field of Search .................................. 172/22; 171/63; 56/16.4 R, 228, 203, 202, 328.1, DIG. 10; 414/469, 472, 476, 480, 703, 717; 298/17 R

(56) References Cited

U.S. PATENT DOCUMENTS

| 3,596,764 | * | 8/1971 | Smith | 171/63 X |
| 3,797,578 | * | 3/1974 | Velasquez | 172/22 |
| 5,002,453 | * | 3/1991 | Shigehisa | 172/22 X |
| 5,069,293 | * | 12/1991 | St. Romain | 172/22 |
| 5,178,221 | * | 1/1993 | Hamawaki et al. | 172/22 |
| 5,305,834 | * | 4/1994 | White | 171/63 |
| 5,423,386 | * | 6/1995 | Lapearous | 172/22 |
| 5,816,336 | * | 10/1998 | Underhill | 172/22 |
| 6,092,607 | * | 7/2000 | Bercheny et al. | 171/63 |

* cited by examiner

Primary Examiner—Victor Batson
(74) Attorney, Agent, or Firm—Ronald E. Greigg; Edwin E. Greigg

(57) ABSTRACT

A soil core collector comprises a structure including a canopy having a top and a back adapted to be supported from a prime mover with two laterally spaced sides each adapted for pivotal connection to the primer mover. A sole plate extends between the two sides and is formed of a series of connected platelets adapted in use to conform to the contour of the ground over which the sole plate passes. The sole plate has a connecting link arrangement to the back of the canopy and is loosely connected to the top of the canopy whereby in a collecting mode the sole plate rests on the ground with the bottom of each side of the canopy and in an emptying mode the canopy is raised causing the sole plate to be raised and platelets each to move about its connecting link arrangement while being held by its top connection.

20 Claims, 3 Drawing Sheets

SOIL CORE COLLECTOR

This invention relates to a soil core collector to be progressed across an area of ground, normally compacted ground, from which cores have been removed by a turf aerating or coring apparatus as a step in the process for revitalising the ground ant any grass growing therein, and to harvest same. The collector is part of, or an attachment to, a prime mover, for example a turf aerator.

Heretofore, different means have been proposed to collect cores left lying scattered across the ground from where they have been removed by a turf aerating apparatus, however all the means have involved either a labour intensive two stage process, for example a window or swath-board mounted onto a turf aerator apparatus or other prime mover to draw the scattered cores into a row for manual collection, or more complicated and therefore more expensive machinery, for example a core harvester comprising a scoop feeding onto a conveyor discharging into a trailer or such for disposal, or a collection box apparatus comprising a removable collection box in front of which a rotatable brush is positioned. When the box is full it requires to be emptied at a suitable location.

Heretofore, a soil core collector has been proposed in U.S. Pat. No. 5 069 293, the collection comprising a structure including a canopy having a top (46, 52, 54) and a back (36) adapted to be supported from the prime mover (14), with two laterally spaced sides (20, 22) each adapted for pivotal connection (40, 42, 44) to the prime mover, a sole plate (18) to extend between the two sides and having a connecting link arrangement to the back of the canopy (see column 4, lines 25–27). In the collection mode the sole plate (18) rests on the ground with the bottom of each side of the canopy, and in the emptying mode the canopy is raised causing the sole plate to be raised (see FIGS. 1 and 3).

Accordingly, the present invention is a soil core collector adapted to be supported from a prime mover, the collector comprising a structure including a canopy having a top and a back with two laterally spaced sides each adapted for pivotal connection to the prime mover, a sole plate to extend between the two sides, the sole plate in a collecting mode resting on the ground with the bottom of each side of the canopy and in a emptying mode the canopy is raised causing the sole plate to be raised wherein the sole plate is formed of a series of contiguous platelets connected such that, in use, the sole plate conforms to the contour of the ground over which the sole plate passes, the sole plate has a connecting link arrangement to the back of the canopy and is loosely connected to the top of the canopy whereby in the emptying mode, the sole plate moves about its connecting link arrangement while being held by its top connection.

Preferably, the platelets extend behind the back of the canopy, and towards their front edges are desirably cranked downwardly and behind the back of the canopy are desirably cranked upwardly. The platelets are beneficially linked together loosely substantially at the front crank line and at or adjacent to their back edges.

The sides of the canopy of the structure desirably extend forwardly with the front edge angled outwardly and downwardly. At the leading part of the bottom edge of each side a skid is desirably provided with the front part thereof cranked or curved upwardly. The back of the canopy is preferably cranked inwardly towards its bottom edge and a reinforcement is desirably provided on the inside of the back at the cranked portion. The reinforcement is preferably a mirror-image of the back of the canopy in the region of the cranked portion and forms internally a void of substantially diamond shape.

Preferably also, one connecting link arrangement is provided for each platelet, the arrangement comprises an upstanding link secured to the respective platelet, an anchorage link secured to the reinforcement, and a connecting link pivotally mounted to the upstanding link at one of its ends and pivotally mounted to the anchorage link at its other end. On the connecting link and near to its pivotal mounting to the upstanding link, one end of a flexible element is preferably secured with the other end anchored to an apertured web provided on the inside of the front of the top of the canopy.

Two spaced anchorage points are preferably provided at or adjacent to the front of the top of the canopy and near to each side. Near to the bottom of the front edge of each side a pin preferably outstands to which one end of an arm is pivotally mounted with the other end to be similarly pivotally mounted to the prime mover.

An embodiment of the present invention will now be described, by way of example, with reference to the accompanying drawings, in which.

Figure 1:
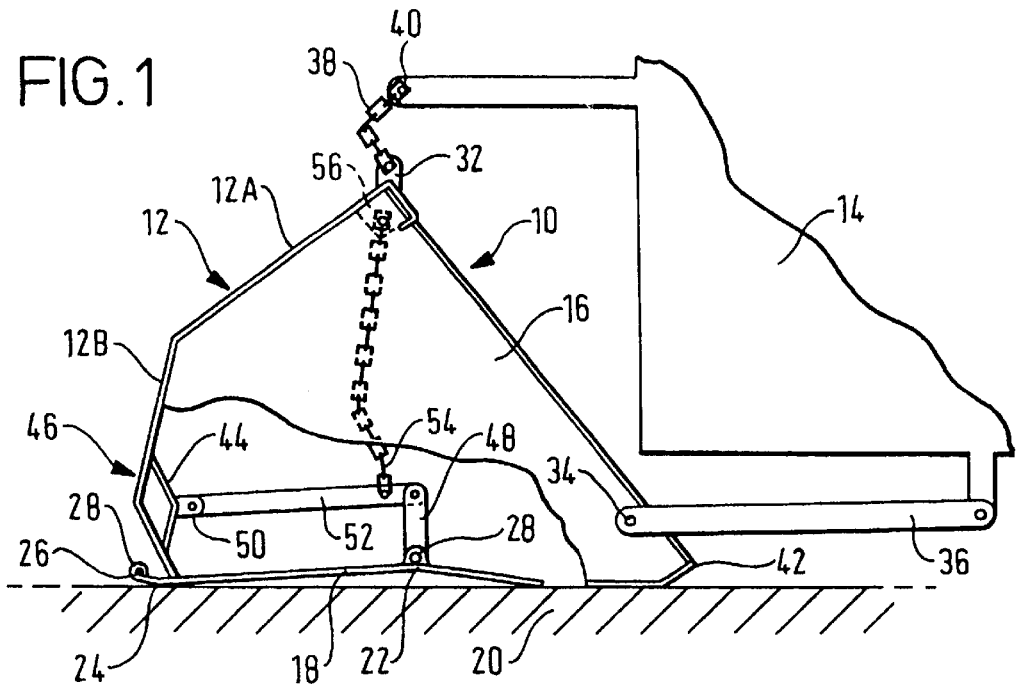
FIG. 1 is a side view of a soil core collector in a collecting mode according to the present invention illustrated with a side cut away for clarity to show a sole plate, a connecting link arrangement, and a reinforcement at the back of a canopy of a structure of the collector.

Referring to the drawings, a soil core collector comprises a structure 10 including a canopy 12 having a top 12A and a back 12B adapted to be supported from a prime mover 14 with two laterally spaced sides 16 each adapted for pivotal connection to the prime mover 14. A sole plate extends between the two sides 16 and formed of a series of nine similar and contiguous platelets 18 connected such that in use, to conform to the contour of the ground 20 over which the sole plate passes. The sole plate has a connecting link arrangement to the back 12B of the canopy 12 and is loosely connected to the top 12A of the canopy 12 whereby in a collecting mode the sole plate rests on the ground 20 with the bottom of each side 16 of the canopy 12 as shown in FIGS. 1 and 3 and in a emptying mode the canopy 12 is raised causing the sole plate to be raised and to move about its connecting link arrangement while being held by its top connection as shown in FIG. 2.

The platelets 18 extend behind the back 12B of the canopy 12 as shown in FIG. 1. Towards the front edges the platelets 18 are cranked downwardly at 22, and behind the back 12B of the canopy 12, the platelets 18 are cranked upwardly at 24. The platelets 18 are linked together loosely substantially at the front crank line 22 and at their back edges 26. The loose linkage comprises an apertured lug 28 provided at each of contiguous side edges of each platelet 18, each pair of contiguous lugs 28 being united by a pin 30 made captive in aligned apertures. The diameter of the apertures being greater than the diameter of the pin.

Each end platelet 18 has an upstanding wall 18A contiguous to the respective side 16 to assist in the relocating of the platelets 18 when the collector is moving from an emptying mode to a collecting mode.

Figure 2:
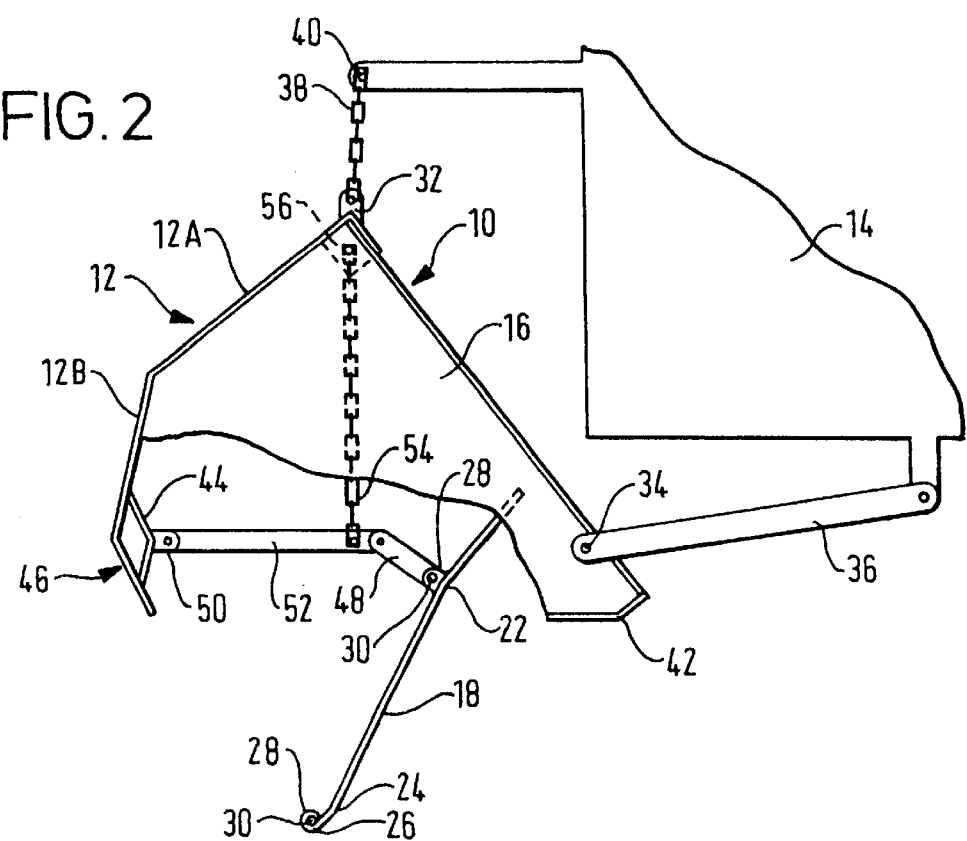
FIG. 2 is a side view of the soil core collector in an emptying mode illustrated with a similar cut-away as in FIG. 1.
Figure 3:
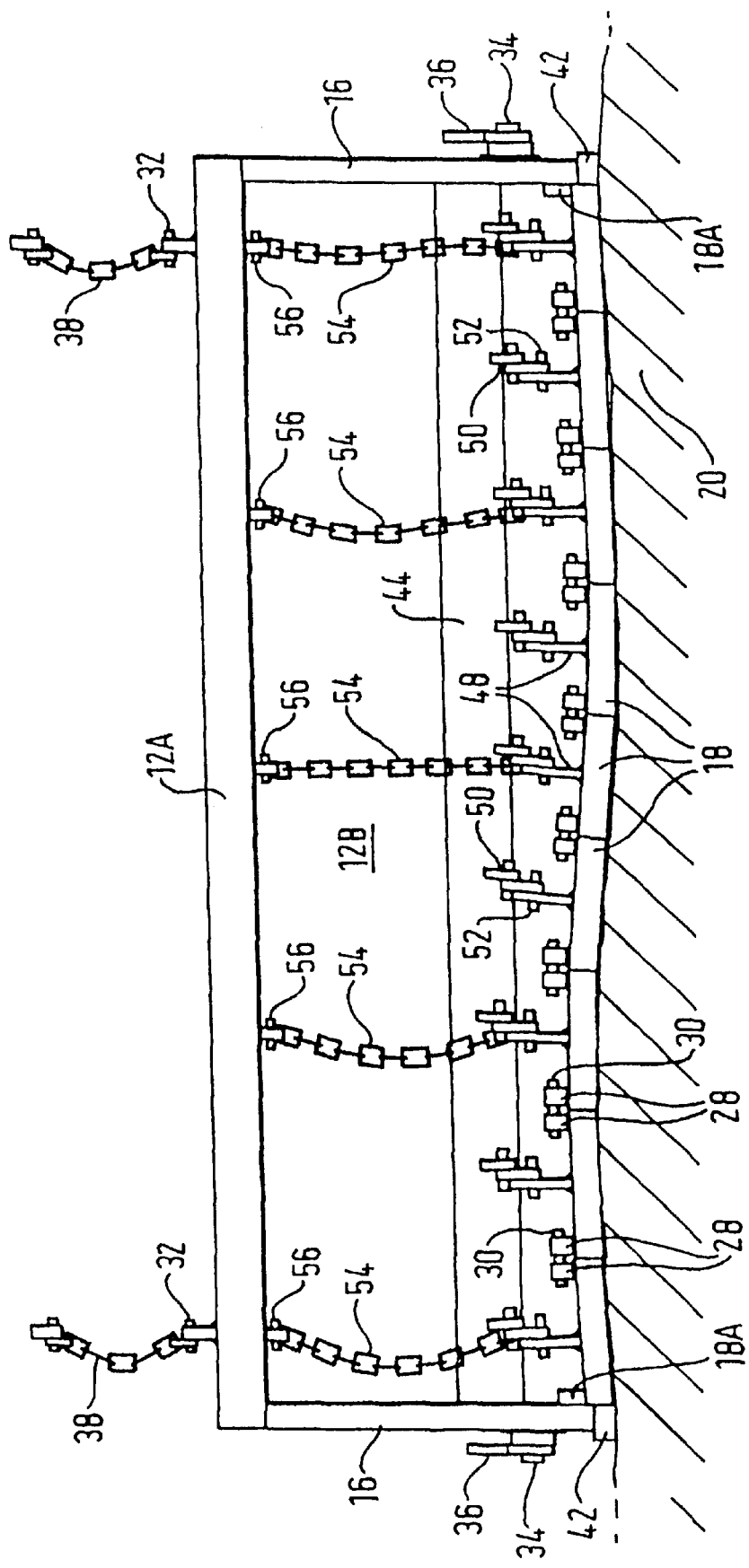
FIG. 3 is a front view of the collector.

The sides 16 of the canopy 12 of the structure 10 extend forwardly with the front edge angled outwardly and downwardly as shown in FIGS. 1 and 2. Two spaced anchorage points 32 are provided at or adjacent to the front of the top 12A of the canopy 12 and near to each side. A flexible element i.e. a chain 38 connects each anchorage point 32 to an anchorage point 40 on the prime mover 14. Near to the bottom of the front edge of each side 16 a pin 34 outstands to which an arm 36 is pivotally mounted with the other end to be similarly pivotally mounted to the prime mover 14 as shown. At the leading part of the bottom edge of each side 16 a skid 42 is provided with the front part thereof cranked or curved upwardly as shown. The back 12B of the canopy 12 is cranked inwardly towards its bottom edge and a reinforcement 44 is provided on the inside of the back at the cranked portion 46. The reinforcement 44 is a mirror-image of the back 12B of the canopy 12 in the region of the cranked portion 46 and forms internally a void of diamond shape.

One connecting link arrangement is provided for each platelet 18, the arrangement comprises an upstanding link 48 secured to the respective platelet 18, an anchorage lug 50 secured to the reinforcement 44, and a connecting link 52 pivotally mounted to the upstanding link 48 at one of its ends and pivotally mounted to the anchorage lug 50 at its other end. On the connecting link 52 and near to its pivotal mounting to the upstanding link 48, one end of a flexible element i.e. a chain 54 is secured with the other end anchored to an apertured web 56 provided on the inside of front of the top 12A of the canopy 12.

In use, as shown in FIGS. 1 to 3 the collector is mounted rearwardly of, and to be dragged behind, the prime mover 14 i.e. a turf aerator by chains 38 and arms 36. In an emptying and travelling mode, the collector assumes the position shown in FIG. 2 with the chains 38 and 54 taut. When the turf aerator is to be used, the collector is lowered to its collecting mode position in FIG. 1. As it is progressed across the ground, for example turfed ground in a golf course, the aerator creates soil cores which the collector harvests. Due to its shape and the linkage arrangement, the front of each platelet 18 is pressurised downwards against the ground so that any cores on the ground are caused to move onto the platelets 18. Due to the number of platelets and their linkaging, the platelets conform to the contour of the ground over which they are progressed. The cores collect in the back of the structure. When this space is filled, the aerator is moved to an area for disposal of the cores and the collector moved into an emptying mode.

Alternatively, the core collector can also be for front, rear or side mounting directly onto a tractor or purpose built utility vehicle. Such a vehicle (not shown) becomes the prime mover 14 and with the core collector fitted is used to gather cores which have been broadcast in a previous operation. When rear mounting the core collector, the prime mover is best used in reverse to avoid trampling the cores. A mounting frame 17 is provided for the necessary pivotal connection for the arm 36 between the frame 17 and the structure 10 in order that the structure 10 can be manoeuvred while allowing it to float with the contours of the ground as described hereinbefore and not be influenced by its contact with the ground. The frame 17 is provided with the necessary connections to enable it to be attached to the prime mover 14 in a manner which allows it to be raised and lowered as required. By way of example, FIGS. 4 & 5 show such an arrangement which would enable the core collector to be used on a standard three point linkage 19 commonly provided on most tractors.

In particular, the mounting frame 17 is of inverted T-shape whose cross-piece 25 extends the width of structure 10 and at each end has a downwardly extending limb 27. The stem 29 of the inverted T-shaped frame 17 is supported by stays 31. The frame 17 provides pivotal connection points at 21,23 for the standard three point linkage 19. Connection point 21 is adjacent to the top of the stem 29 and connection point 23 is adjacent to the bottom of each limb 27. Arms 36 are now used as push-links with one end pivotally connected to respective side 16 of the structure 10. The other end of each link 36 is pivotally connected to point 23 of the frame 17. The two points 23 and side 16 connections are positioned close to the ground to maintain arms 36 substantially parallel to the ground. This will enable the core structure 10 to be manoeuvred while allowing it to float freely with the contours of the ground.

In order that this pivotal connection between frame 17 and arm 36 remains at a constant level close to the ground, a pair of wheels 15 are provided one near to each end of the cross-piece 25 of the mounting frame 17 and close to the said pivotal connections. The tractor operator can therefore lower the core collector into work in the knowledge that arms 36 are automatically substantially parallel to the ground and that there is no chance of frame 17 gouging or tearing the surface of the turf. In order that the core collector can be raised out of work and to empty collected cores, chains 38 are provided between anchorages 33 adjacent to the tops of limbs 27 and anchorage 35 on arms 36 to limit the downward travel of arms 36. Stop-pins 37 are also provided. Arms 36 abut these pins 37 to limit the backward tilt of structure 10 when the core collector is in a raised position. The normal function of the core collector as described in the earlier paragraphs and illustrated in FIGS. 1, 2 and 3 still apply. Other arrangements and methods of attaching the core collector could be used without deviating from its basic working principles, for example: instead of lifting the core collector by chain 38 in FIG. 5, an arm (not shown) could be extended from frame 17 and the structure 10 lifted in the same manner as described in FIG. 1 with chain 38.

Figure 4:
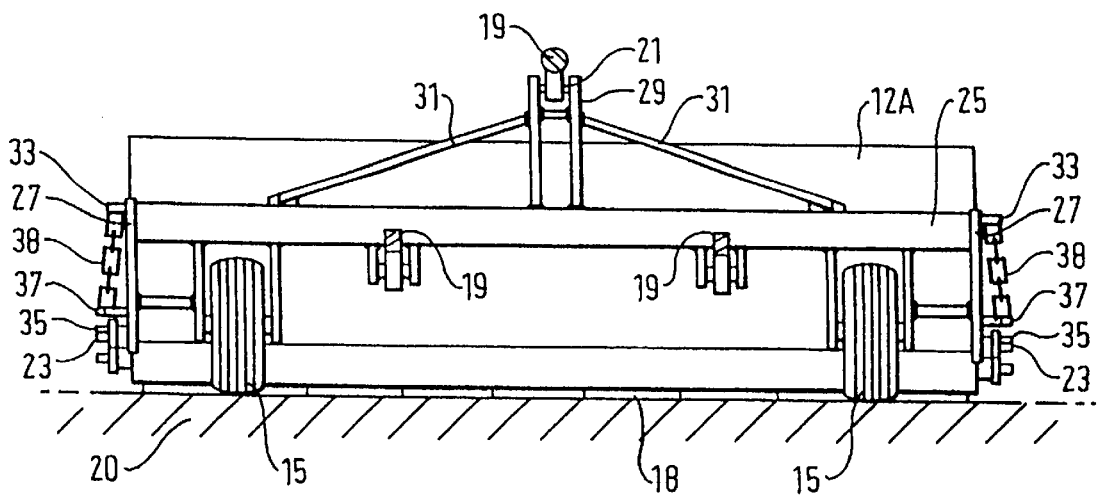
FIG. 4 is a front view of a soil core collector in an alternative use being differently mounted on a prime mover.
Figure 5:
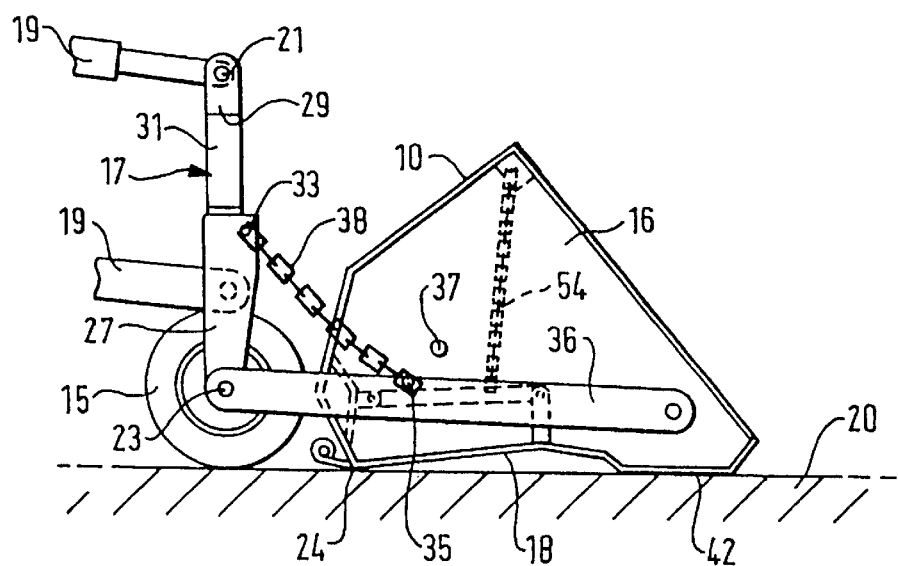
FIG. 5 is a side view of the soil core collector shown in FIG. 4.

The core collector could be equally effective when mounted to custom built turf or utility vehicles which in many cases use a tilting method of raising an attachment rather than the three point linkage system illustrated FIGS. 4 & 5, however the same principles of frame and collector would apply.

The foregoing relates to a preferred exemplary embodiment of the invention, it being understood that other variants and embodiments thereof are possible within the spirit and scope of the invention, the latter being defined by the appended claims.

What is claimed is:

1. A soil core collector adapted to be supported from a prime mover, the collector comprising a structure including a canopy having a top and a back with two laterally spaced sides each adapted for pivotal connection to the prime mover, a sole plate extending between the two sides, the sole plate in a collecting mode resting on the ground with a bottom of each side of the canopy and in an emptying mode the canopy is raised causing the sole plate to be raised, the sole plate comprising a series of contiguous platelets connected such that, in use, the sole plate conforms to a contour of the ground over which the sole plate passes, the sole plate has a connecting link arrangement to the back of the canopy is loosely connected to the top of the canopy whereby in the emptying mode, the sole plate moves about its connecting link arrangement while being held by its top connection.

2. A soil core collector according to claim 1, wherein the platelets extend behind the back of the canopy and have front edges, and towards their front edges are cranked downwardly and behind the back of the canopy are cranked upwardly.

3. A soil core collector according to claim 2, wherein the platelets have back edges, and are linked together loosely to form a loose linkage at a front crank line and also at or adjacent to their back edges.

4. A soil core collector according to claim 3, wherein the loose linkage comprises an apertured lug provided at each of contiguous side edges of each platelet, each pair of contiguous lugs being united by a pin made captive in aligned apertures.

5. A soil core collector according to claim 1, wherein the sides of the canopy of the structure extend forwardly with a front edge angled outwardly and downwardly.

6. A soil core collector according to claim 1, wherein at the bottom edge of each side a skid is provided with a front part thereof cranked or curved upwardly.

7. A soil core collector according to claim 1, wherein the back of the canopy has a bottom edge, and the back of the canopy is cranked inwardly towards its bottom edge and a reinforcement is provided on the back of the canopy.

8. A soil core collector according to claim 7, wherein the reinforcement is a mirror-image of the back of the canopy in the region of the cranked portion of the back of the canopy and forms internally a void of substantially diamond shape.

9. A soil core collector according to claim 7, wherein one connecting link arrangement is provided for each platelet, the arrangement comprises an upstanding link having ends secured to a respective platelet, an anchorage lug secured to the reinforcement, and a connecting link pivotally mounted to the upstanding link at one of its ends and pivotally mounted to the anchorage lug at its other end.

10. A soil core collector according to claim 8, wherein one connecting link arrangement is provided for each platelet, the arrangement comprises an upstanding link having ends secured to a respective platelet, an anchorage lug secured to the reinforcement, and a connecting link pivotally mounted to the upstanding link at one of its ends and pivotally mounted to the anchorage lug at its other end.

11. A soil core collector according to claim 9, wherein on the connecting link and near to its pivotal mounting to the upstanding link, one end of a flexible element is secured with the other end anchored to an apertured web provided on an inside portion of a front of the top of the canopy.

12. A soil core collector according to claim 1, wherein near the bottom of a front edge of each side a pin outstands to which one end of an arm is pivotally mounted and an opposite end of the arm is adapted to be similarly pivotally mounted to the prime mover.

13. A soil core collector according to claim 5, wherein near the bottom of a front edge of each side a pin outstands to which one end of an arm is pivotally mounted and an opposite end of the arm is adapted to be similarly pivotally mounted to the prime mover.

14. A soil core collector according to claim 1, wherein two spaced anchorage points are provided at or adjacent to a front of the top of the canopy and near to each side.

15. A soil core collector according to claim 14, wherein a flexible element is adapted to connect each anchorage point to an anchorage point on the prime mover.

16. A soil core collector according to claim 1, wherein a mounting frame is provided to which the structure is secured, the mounting frame being adapted to be secured to a lifting/tilting arrangement provided on the prime mover.

17. A soil core collector according to claim 16, wherein the mounting frame mounts a pair of axially-spaced ground-engaging wheels.

18. A soil core collector according to claim 16, wherein at each end of a cross-piece of the frame, an anchorage is provided to which one end of a flexible element is connected, an opposite end of the flexible element being connected to an anchorage point on an arm.

19. A soil core collector according to claim 17, wherein at each end of a cross-piece of the frame, an anchorage is provided to which one end of a flexible element is connected, an opposite end of the flexible element being connected to an anchorage point on an arm.

20. A soil core collector according to claim 18, wherein one end of each arm is pivotally mounted to a pin on a respective side of the structure with an opposite end of each arm pivotally mounted to a connection point on a downwardly-extending limb provided at each end of the cross-piece of the mounting frame.

* * * * *